N. EDWARDS.
Corn-Receiver.

No. 219,080. Patented Sept. 2, 1879.

Witnesses:
J. W. Garner
W. S. D. Haines

Inventor:
N. Edwards
per
F. A. Lehmann,
Atty.

N. PETERS, PHOTO-LITHOGRAPHER, WASHINGTON, D. C.

UNITED STATES PATENT OFFICE.

NATHANIEL EDWARDS, OF WASHINGTON COURT HOUSE, OHIO.

IMPROVEMENT IN CORN-RECEIVERS.

Specification forming part of Letters Patent No. 219,080, dated September 2, 1879; application filed April 29, 1879.

*To all whom it may concern:*

Be it known that I, NATHANIEL EDWARDS, of Washington Court House, in the State of Ohio, have invented certain new and useful Improvements in Corn-Receivers; and I do hereby declare the following to be a full, clear, and exact description of the invention, such as will enable others skilled in the art to which it pertains to make and use it, reference being had to the accompanying drawings, which form part of this specification.

My invention relates to an improvement in corn and grain receivers; and it consists in a suitable piece of cloth, canvas, or other such suitable material, which is provided with a post at each corner, and which is used to receive the grain just before it is loaded into the wagon, so that the whole quantity can be lifted into the wagon at once without the trouble of shoveling it in one shovelful at a time, as will be more fully described hereinafter.

The accompanying drawings represent my invention.

Figure 1:
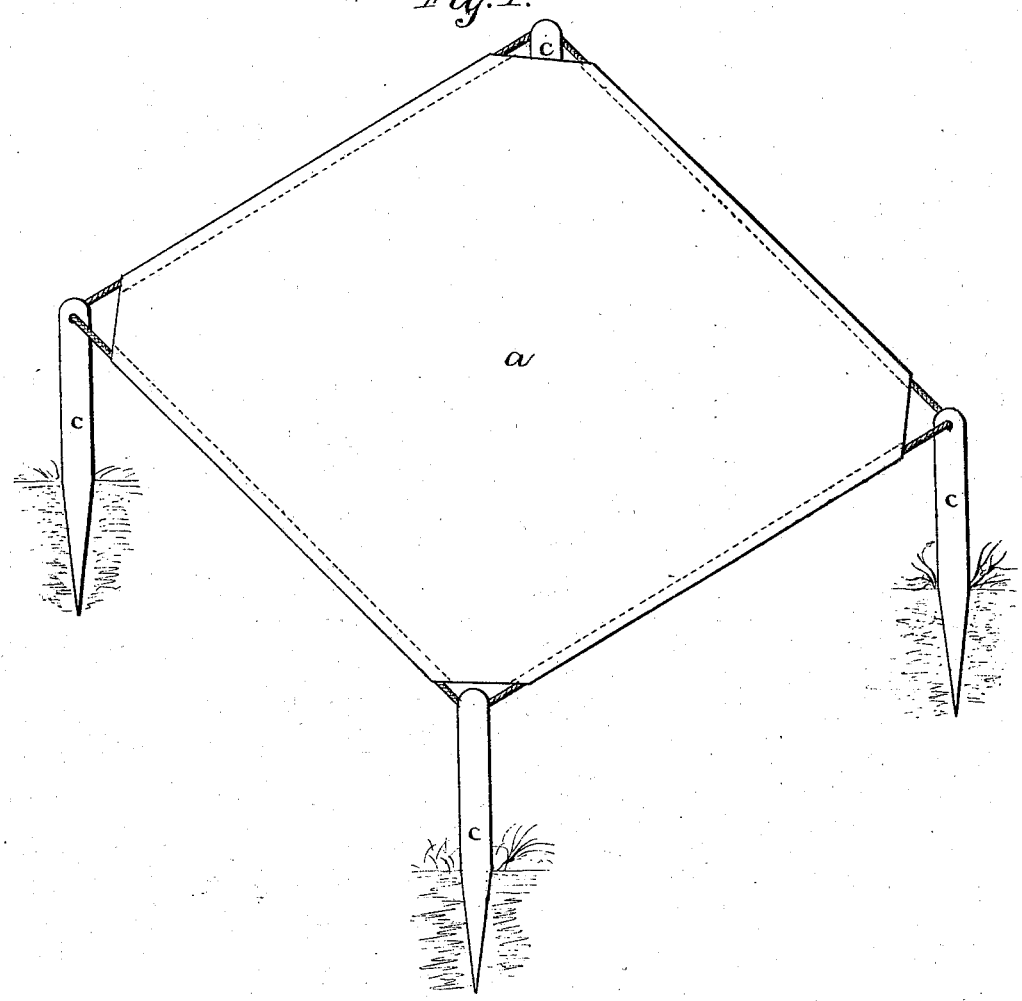
Figure 2:
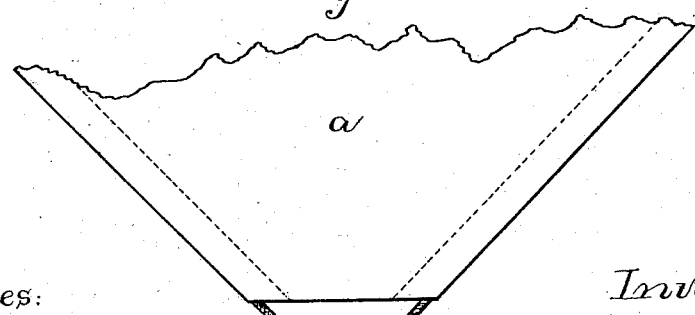

Figure 1 is a perspective view of my invention. Fig. 2 is a plan view of one corner of my receiver.

*a* represents a square piece of cloth, canvas, or any other suitable material, of any size desired, which has a string or cord running around all four of its edges, as shown. Secured to each corner of this cloth or canvas *a*, by means of this string, is a sharpened stake, *c*, the string being made to pass through a hole in the upper end of the stakes, so that they can be detached from the cloth whenever desired.

This receiver is intended to be used as follows: When it is desired to gather corn from the shock for the purpose of throwing it into a wagon, the receiver is placed at a convenient distance from the shock, and may be either supported above the ground by means of the stakes, which are thrust into the earth, or the receiver may be spread out upon the ground. As fast as the corn is taken from the shock it is thrown directly upon the receiver, and when the receiver is full the whole quantity may be lifted into the wagon at once, the stakes serving as handles by which the load is raised.

Ordinarily the corn, when taken from the shock, is thrown in a pile upon the ground, and then has to be thrown, either by the hands or by a shovel, into a wagon, which consumes a great deal of time. My invention is intended to save all this time by emptying the whole load into the wagon in the same time that it would take to throw in a few ears.

My device will be found to be especially useful in the field where husked corn, potatoes, turnips, and other such articles have to be loaded into the wagon. While the boy is driving the loaded wagon to the barn, the men or man in the field have only to spread one of my devices upon the ground and go on loading it up until the wagon returns, when, by taking hold of the stakes, the whole load can be lifted into the wagon at once. When my device is lying flat on the ground, the grain or other article can be readily pushed, raked, or shoveled upon it, and the whole quantity quickly raised into the wagon. Thus a great deal of labor and time are saved.

I am aware that canvas spreads have been suspended from stakes to form hammock-tents, and spread under trees to prevent the falling fruit from being bruised, and these I disclaim.

Having thus described my invention, I claim—

A device for loading grain and other such articles into wagons and bins, consisting of a sheet of canvas, or equivalent material, having handles or stakes loosely connected thereto, which handles serve not only for lifting the load, but to hold the canvas raised above the ground, substantially as shown and described.

In testimony that I claim the foregoing I have hereunto set my hand this 2d day of May, 1877.

NATHANIEL EDWARDS.

Witnesses:
ANTHONY ALLEN,
J. P. ROBINSON.